United States Patent [19]

Cyriax et al.

[11] Patent Number: 4,472,127
[45] Date of Patent: Sep. 18, 1984

[54] MOLD-CHANGING APPARATUS FOR INJECTION-MOLDING MACHINE

[75] Inventors: Wilhelm Cyriax; Günter Langenecker, both of Meinerzhagen; Karl-Albert Hardenacke, Drolshagen-Frenkhausen, all of Fed. Rep. of Germany

[73] Assignee: Battenfeld Maschinenfabriken GmbH, Meinerzhagen, Fed. Rep. of Germany

[21] Appl. No.: 488,781

[22] Filed: Apr. 26, 1983

[30] Foreign Application Priority Data

Apr. 26, 1982 [DE] Fed. Rep. of Germany ... 3212045[U]
Jun. 3, 1982 [DE] Fed. Rep. of Germany ....... 3220911

[51] Int. Cl.³ ........................... B29F 1/00; B29C 1/00
[52] U.S. Cl. ................................ 425/183; 264/328.7; 425/186; 425/190; 425/542
[58] Field of Search ............... 425/182, 183, 186, 190, 425/542; 264/328.7

[56] References Cited

U.S. PATENT DOCUMENTS

4,005,964 2/1977 Bishop ............................ 425/190 X
4,202,522 5/1980 Honas ............................. 425/186 X

FOREIGN PATENT DOCUMENTS

56-70925 6/1981 Japan ................................... 425/542

OTHER PUBLICATIONS

Engel Information, A-67-TV-9/81, (pp. 1-5).

*Primary Examiner*—Jay H. Woo
*Assistant Examiner*—Tinker R. McBrayer
*Attorney, Agent, or Firm*—Karl F. Ross; Herbert Dubno

[57] ABSTRACT

An injection-molding machine whose mold-carrying plates are provided with quick-release locking devices for engagement with adapter plates on respective halves on the mold, also has at least one of the plates provided with a horizontal transverse guide for the mold whereby the mold can be inserted laterally and removed laterally. A carriage is displaceable along the machine and has roller conveyors and a device for drawing a mold from the machine onto the roller conveyor or pushing a mold from a roller conveyor onto the machine.

20 Claims, 7 Drawing Figures

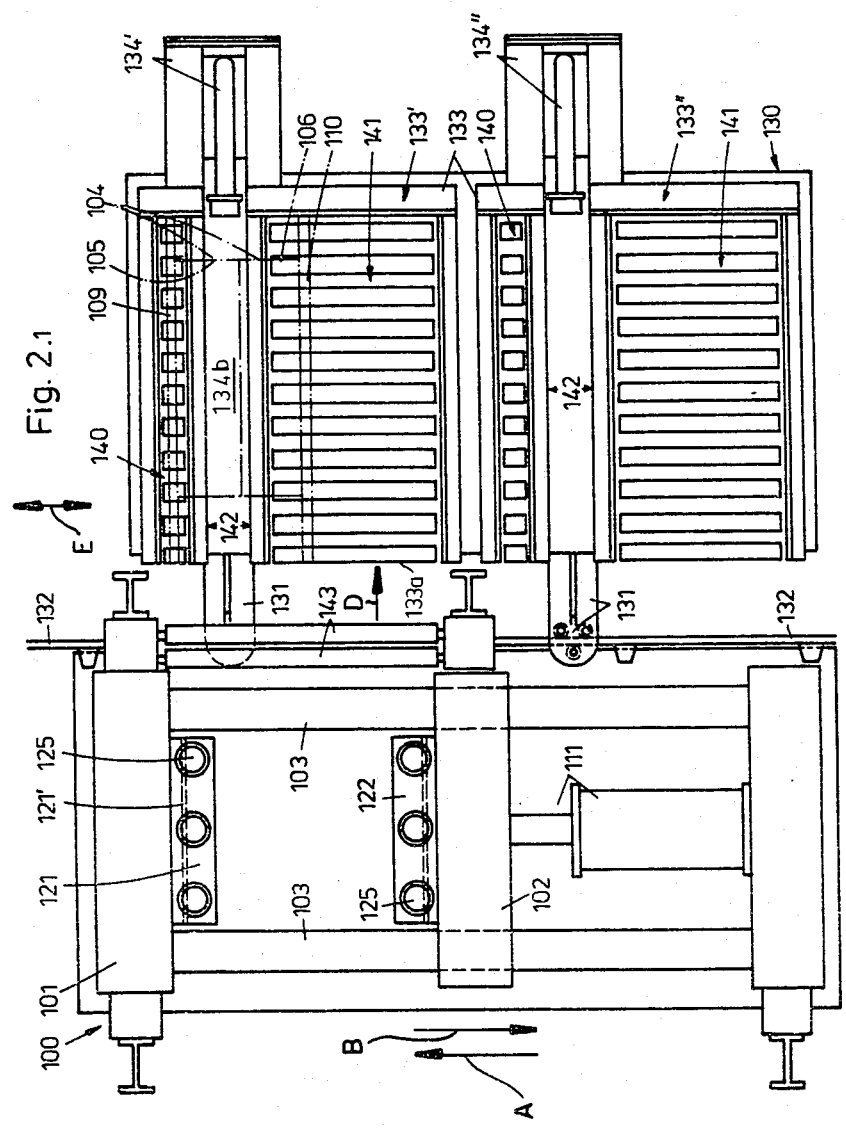

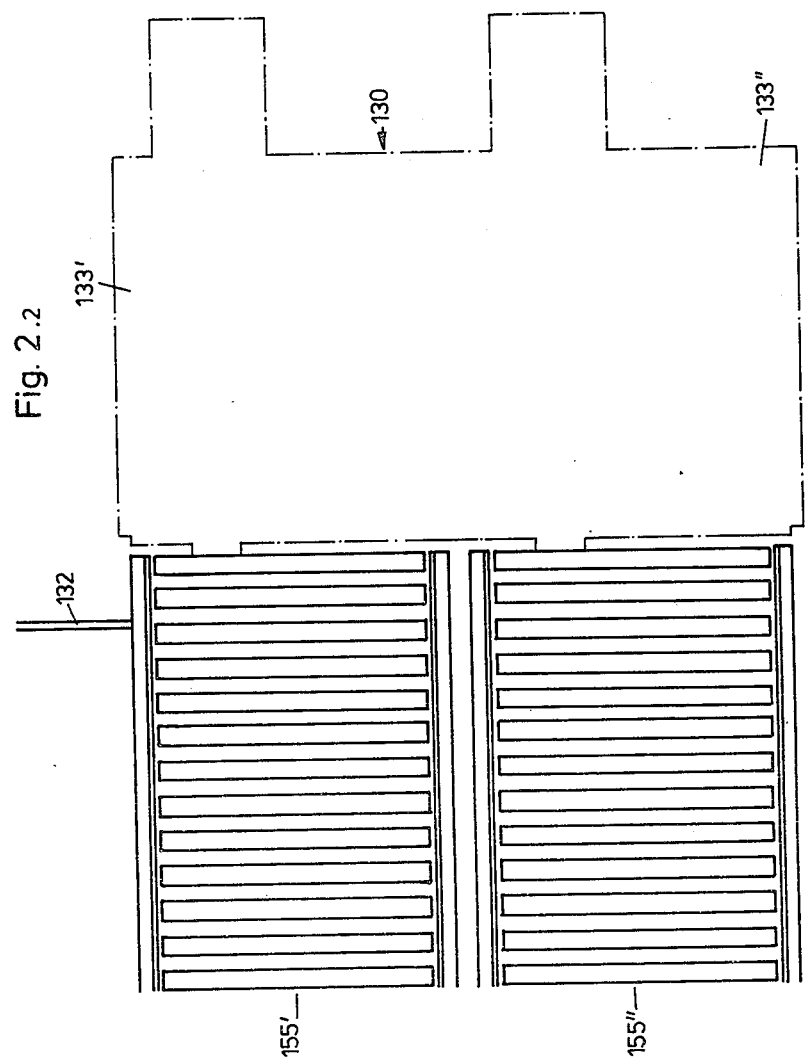

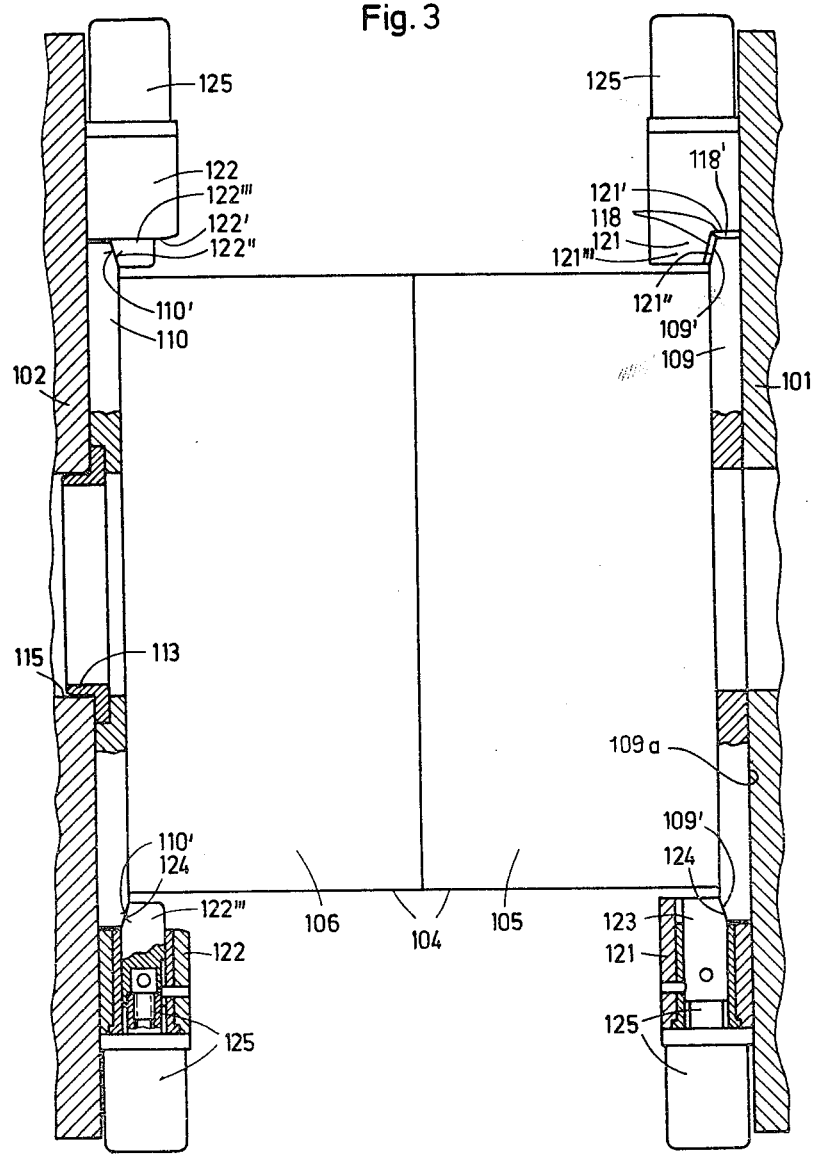

MOLD-CHANGING APPARATUS FOR INJECTION-MOLDING MACHINE

CROSS REFERENCE TO RELATED APPLICATION

This application is related to the commonly assigned concurrently filed copending application Ser. No. 488,755. Reference may also be had to the patents listed therein dealing with injection molding.

FIELD OF THE INVENTION

Our present invention relates to an apparatus for rapidly changing the mold of an injection-molding machine and, more particularly, to an apparatus for handling molds in connection with a quick-change assembly as described in said application, for example, for rapidly securing a mold in an injection-molding machine.

BACKGROUND OF THE INVENTION

An injection-molding machine commonly comprises a machine bed on which a pair of mold-carrying plates can be provided, a fluid-pressure-operated cylinder arrangement for displacing at least one of these plates toward and away from the other in a mold-opening and mold-closing direction and for holding the mold closed between these plates during the injection at elevated pressure of a synthetic resin or plastics material which then sets in the mold cavity to form an object.

The object is generally ejected upon opening of the mold, i.e. retraction of the mold-carrying plate or platens with or without the use of an ejection mechanism with which the machine may be equipped.

One or both of these mold-carrying plates can be provided with one or more apertures communicating with a source of the flowable but settable material, e.g. a cylinder in which one or more worms can plastify the synthetic resin material and which may be axially movable or provided with a ramp to drive the flowable material through the aforementioned passage or passages in the mold-carrying plate into the mold cavity.

The machine can also be provided with conventional service facilities, e.g. fluid circuitry for circulating lubricants or coolants through the mold or into the various parts.

It is customary to make one of the mold-carrying plates stationary while the other is movable and is guided on, say, four circular-section guide bars which properly align the two mold-carrying plates. The conventional approach also individually secures the two halves of a separable mold to the respective mold-carrying plates. More specifically, the mold may consist of two or more parts which are separated and which, when brought together, will define the mold cavity. These parts are customarily and hereinafter referred to as mold halves even if additional mold parts are provided and either part makes up more or less than a true geometric half of the mold herein.

In the injection-molding field, considerable down-time of an injection-molding machine has frequently been considered endemic since mold-changing operations were fairly complex. Mold-changing operations are involved when one must replace a damaged or worn mold or when one wishes to substitute a different product for the product previously manufactured by the machine. The dismounting of the mold part from its mold-carrying plate was a complex and time-consuming ordeal as was the connection of the various service fittings to the mold and the resetting of machine controls to accommodate the new mold and its cavities.

Because injection-molding machines are generally operated with high output rates, a down-time which is even comparatively small may result in a substantial drop in productivity. Hence systems for the rapid change of the mold, i.e. quick-change mold systems are of interest. A quick-change mold system requires a rapid locking arrangement which can quickly secure a mold part to a mold-carrying plate.

Thus, the Ludwig Engel KG Maschinenfabrik, A-4311 Schwertbach, Austria, has described in the prospectus Engel-Information A-67-TV-9/81 a rapid attachment device for securing each of the mold halves to the respective mold-carrying plates or platens of an injection-molding machine of the type described, thereby reducing the down-time.

A significant disadvantage of this system, however, is that it nevertheless requires a number of traction bolts to be used to secure the mold heads to the mold-carrying plates and hence time-consuming screwing operations. Another disadvantage of this system is that the bolts used for mounting, centering and alignment must project beyond the base of the mold halves, thereby requiring a considerable span between the mold-carrying plates adapted to receive the mold. This may require larger means than may be necessary. A corollary problem, also resulting from the large gap between the mold-carrying plates, is that the centering and attachment operations require considerable replacement of at least one of the mold-carrying plates, a factor which has been found to contribute to imprecision in alignment.

Finally, we should take note of the fact that prior-art devices for changing molds in an injection-molding machine generally include cranes and like lifting or hoisting appliances to enable the massive mold structure to be moved from its position between the platens, to be carried away and to be replaced with another mold. When the new mold is suspended from such a hoist, it is difficult to properly align the bolts with the bores of the mold-carrying plate as a result of the swing of the hoist and the load suspended therefrom.

OBJECT OF THE INVENTION

It is the principal object of the present invention to provide an improved apparatus for facilitating the changing of the molds of an injection-molding machine.

Another object of this invention is to provide an apparatus which can cooperate with quick-change molds to minimize the down-time of an injection-molding machine resulting from mold-changing operations therein.

It is yet another object of our invention to provide an apparatus which avoids all of the drawbacks described and which can rapidly and economically permit replacement of an injection-mold in an injection-molding machine with high precision and minimum loss of time.

SUMMARY OF THE INVENTION

These objects and others which will become apparent hereinafter are attained, in accordance with the present invention, in a rapid mold-changing device or apparatus for an injection-molding machine provided with means for insertion and removal of a mold assembly between the two mold-carrying plates or platens in a direction transverse to the mold opening and closing direction.

According to the invention, a lateral guide is provided for the mold assembly on one or both of the mold-carrying plates or platens which defines a linear but horizontal insertion and removal path for the mold. The injection-molding machine, moreover, is provided with a displacing device or unit which can run alongside the machine and parallel to the mold opening and closing direction on rails which are fixed relative to the injection-molding machine. The device can comprise a carriage shiftable along this rail for alignment of a pusher/retractor with a mold, the pusher/retractor being provided above a transport path onto which the mold is withdrawn onto the carriage and from which a replacement mold can be introduced into the machine.

Basically, therefore, the conventional injection-molding machine is modified, according to the invention, by providing one or both of its mold-carrying plates with a guide for the mold assembly which allows horizontal insertion of the mold and withdrawal of the mold perpendicular to the horizontal direction of mold-opening and mold-closing displacement. The conventional machine is also modified by providing it parallel to the latter direction with a guide in the form of the aforementioned rails upon which a carriage is shiftable in this direction. The mold-changing carriage can have a conveyor extending in the horizontal mold replacement direction and adapted to accept longitudinal portions of the mold for facilitating retraction and insertion of the mold. The carriage also is provided with the means for displacing the carriage along the track and for shifting the mold along the conveyor surface of the carriage for retraction and insertion.

The latter means will generally be referred to hereinafter as a transfer or transport means and will be understood to be constructed and arranged to be able to shift the mold into the guides of the injection-molding machine and to withdraw the mold from these guides.

It has been found to be advantageous to control the drive for the carriage by limit switches which can serve to align the transverse transport or pressure device with the guides. The use of limit switches can simplify the construction of the drive of the carriage and advantageously this drive can be an electrohydraulic drive system using electrically controlled valves, for example, in circuit with the limit switches to control hydraulic fluid flow to a hydraulic motor or a piston and cylinder arrangement drivingly connected with the carriage.

The drive and guide arrangement for the carriage on the fixed rail or rails preferably includes pairs of rails which engage the rails from opposite sides.

It has been found to be highly advantageous to provide the carriage with two substantially identical or similar transverse transport devices which can be alternately aligned with the guide and one of which can serve to retract a mold from the machine while the other serves to insert another mold into the machine.

According to still another feature of the invention, the transverse conveyor comprises a roller conveyor, i.e. an array of mutually parallel free running rollers, which are entrained by the mold. When two transverse transports are used of course, each can be provided with a separate roller conveyor. The conveyor plane of this roller conveyor should correspond to the plane of the bottom of the mold when the latter is in the guides of the injection-molding machine and thus should be coordinate to the position of the machine guides. When these guides also engage the bottom surface of the mold, naturally, the guide surface will be coplanar with the conveyor surface.

The carriage, according to the invention, for precise alignment of a mold on the carriage with the guides of the machine can be provided with a horizontal guide running transversely of the mold-opening and mold-closing direction. This horizontal guide can engage an adapter plate premounted on the mold (see the aforementioned copending application). In this aspect of the invention, the guide may include rollers on which the adapter plate can run and a pair of spaced-apart opposing jaws or rails between which the adapter plate can pass. When the adapter plate is provided with a bevel to cooperate with the locking devices and the mold-carrying plates which secure these adapter plates in place, these rails or tracks can have bevels which are complementary to ensure precise guidance of the adapter plates and hence the molds.

Advantageously, the rollers provided for this latter guide system can be of a length substantially less than that of the adjacent roller conveyor and the pusher can in part be guided between the two sets of rollers and can project above the transport plane which is a plane perpendicular to the tops of these rollers.

Each of the sets of the rollers, according to the invention, may be mounted in a respective frame and means can be provided to adjustably position these frames on the carriage. Advantageously, the heights of the conveyors on the carriage can be adjusted as well and it has been found to be advantageous to provide the injection-molding machine chassis or frame with at least a short roller conveyor which can be aligned with the roller conveyors of the carriage to support the mold over the region between the carriage and engagement by the machine guides of the mold.

BRIEF DESCRIPTION OF THE DRAWING

The above and other objects features and advantages will become more readily apparent from the following description, reference being made to the accompanying drawing in which:

FIG. 2.1 is a plan view taken in the direction of arrow II of FIG. 1;

FIG. 2.2 is a diagram illustrating another feature of the invention;

FIG. 3 is a section drawn to a slightly larger scale taken along the line III—III in FIG. 1;

SPECIFIC DESCRIPTION

Figure 1:
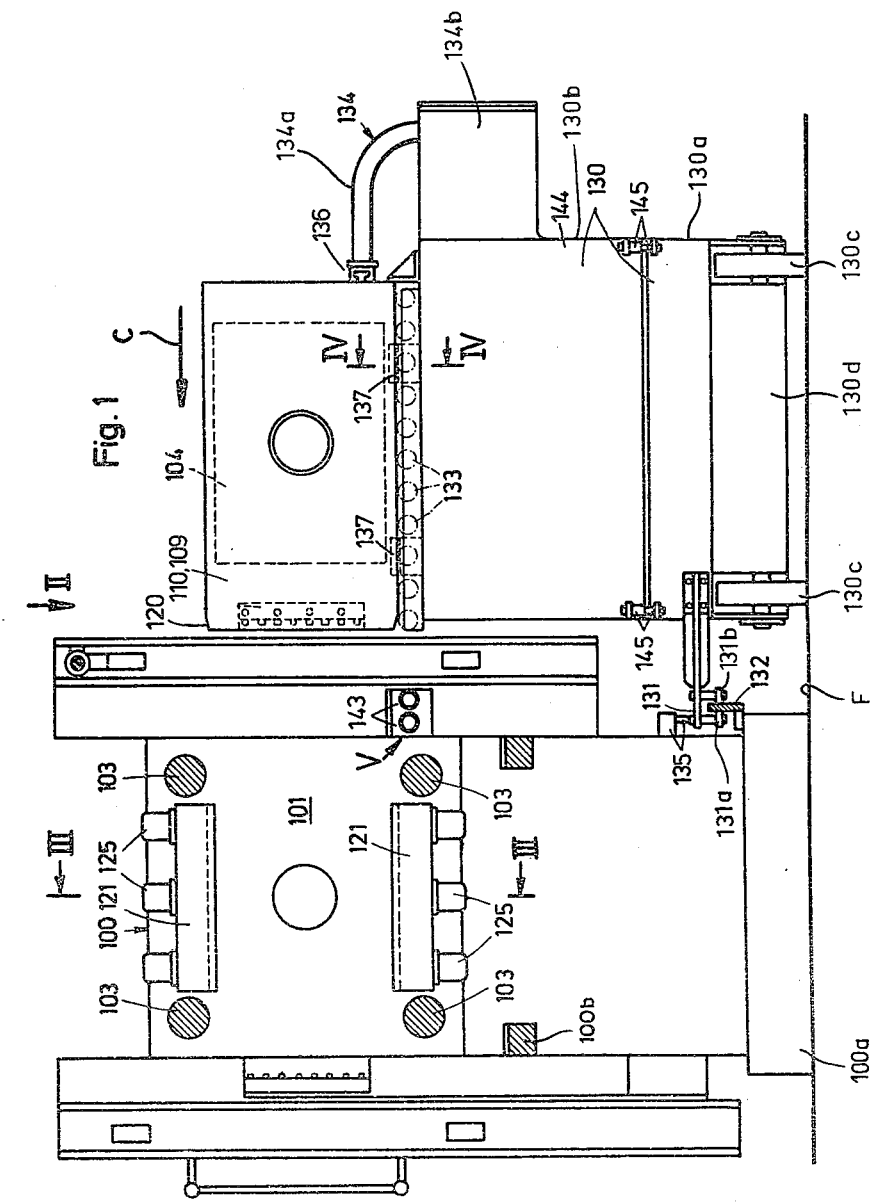
FIG. 1 is a cross-sectional view taken in a vertical plane generally transverse to the mold opening and closing direction and through an injection-molding machine between the mold-carrying platens thereof and showing the carriage of the invention in side elevation.

In FIGS. 1 through 3 we have shown an injection-molding machine 100 which is of conventional design and thus has only been illustrated diagrammatically. This machine comprises the usual bed 100a, a support frame 100b on this bed and four circular cross section bars 103 extending horizontally and defining the mold-opening and mold-closing direction.

The machine also comprises a fixed mold-carrying plate or platen 101 which is juxtaposed with a movable mold-carrying plate or platen 102, the latter being provided with a hydraulic piston and cylinder arrangement 111 for displacing the mold-carrying plate 102 in the mold-closing direction A or in the mold-opening direction B on the guide bars 103.

While the mold 104 is not shown in place in FIGS. 1 and 2.1, it has been shown in some detail in FIG. 3 and particular reference with respect to the construction of the mold assembly can be gleamed from the aforementioned copending application.

The mold 104 comprises two separable mold members, namely the mold halves 105 and 106 which together define a mold cavity (not shown) which communicates, when the mold is closed, with an injection system for forcing thermoplastic synthetic resin and the like into the mold cavity.

The latter system is also not illustrated and is of conventional design.

The mold is introduced into the injection-molding machine in the direction of arrow C (FIG. 1) and is removed in the direction of arrow D (FIG. 2), i.e. in a direction perpendicular to the plane of the paper in FIG. 3.

For safety and easy of handling, we prefer to provide a latch of the type shown in the aforementioned copending application to hold the two mold halves 105 and 106 together for insertion and removal of the mold. After the mold is inserted into the injection-molding machine the latch can be removed and the mold halves disconnected to accommodate the mold-opening and mold-closing movements.

The mold half 105 is premounted upon a planar adapter plate 109 having a flat outer surface 109a free from bolts or rejections which may require a wider spacing of the platens 101, 102 than would otherwise be the case. The mold half 106 is mounted in a similar way on the adapter plate 110. The plates 109 and 110 may have identical dimensions and may be provided with a grid or like array of attachment sites for the parts of mold 104, thereby allowing a variety of molds to be mounted on mutually identical adapter plates.

The mold replacement, i.e. the insertion and withdrawal of the mold from the machine, is effected in the horizontal direction and transverse to the opening and closing movements of the mold cavity. This mold replacement is effected by a quick change unit which can carry the mold to the machine, insert the mold into the machine, retract the mold from the machine and carry the retracted mold away from the machine, all in the horizontal direction.

For mounting a mold in the injection-molding machine (FIG. 3), the affixed mold-carrying plate 101 is provided with a pair of guide bars 121 which extend horizontally and form upper and lower guides for the upper and lower longitudinal edges of the adapter plate 109. More specifically, the bars 121 constitute horizontal guides into which the adapter plate 109 can be inserted and have channels which are defined by guide surfaces which engage complementary guide surfaces at the longitudinal edge of the adapter plate 109. Similarly guide bodies 122 are provided between which the adapter plate 110 can be engaged by movement of the mold-carrying plate 102 in the mold-closing direction once the mold has been fitted into the guides 121.

Clamping bodies in the form of wedging members 123 and 122''' are provided on these bars and are forced inwardly by respective hydraulic piston and cylinder arrangements 125 to clamp the adapter plates 109 and 110 against the respective mold-carrying plates 101, 102. The slide guides 121 of the mold-carrying plate 101 are defined by mirror symmetrically disposed bars which have guide surface 121' parallel to the direction of insertion of the adapter plate 109 and abutment surfaces 121" which lie ahead of the front face 109' of the adapter plate movement of the mold to the left in FIG. 3 once the longitudinal edges of the adapter plate have been shoved into the guideways 118.

While the support surfaces 121' are formed unitarily on the bars 121, the corresponding surfaces of the bars 122 are provided by the cams 122''' which reach over the beveled surface 110' on the front side of the adapter plate 110. The surfaces 109' and 121" are beveled complementarily as are the engaging surfaces 110' and 124.

To facilitate the insertion of the adapter plate 109 in the guides 121, the input edges of the guideways 118 are beveled at 118', for example, as best seen in FIG. 3. The corresponding leading edges of the upper and lower corners of the plate 109 can be similarly and complementarily beveled.

With the surfaces 121' and 121" of the bars the entire mold and, of course, the adapter plate 109, can be precisely centered and aligned on the stationary mold-carrying plate 101 and anchored to the latter by actuation of the cams by the respective cylinders 125. The latter lie outwardly of the bars as is especially clear from FIGS. 1 and 3.

After the entire mold hass been mounted on the mold-carrying plate 101 by the adapter plate 109, the mold-carrying plate 102 is shifted toward the adapter plate to position the adapter plate 110 between the guides 122 and the adapted plates are then locked as described to the respective mold-carrying plates.

Before the adapter plate 10 abuts the front face of the mold-carrying plate 102 centering boss 113 of the adapter plate 110 can engage in a centering recess or opening 115 of the mold-carrying plate 102 to ensure precise alignment of the mold half 106 on this mold-carrying plate. It should be apparent that with this quick-locking arrangement for the mold 104 on the injection-molding machine, rapid release and engagement of a mold is possible and hence mold replacement is facilitated.

This rapid locking arrangement has been found to be of particular advantage when used with the rapid replacement mechanism to be described below.

Referring again to FIGS. 1 and 2.1, it can be seen that the latter mechanism comprises a transport carriage 130 which is provided with a base or chassis 130a and a superstructure 130b. The base is provided with wheels 130c which ride upon the floor F adjacent the injection-molding machine. These wheels may be driven by a motor, e.g. a hydraulic motor forming part of an electrohydraulic control system, the electrical controls of which may be valves or the like.

The carriage 130 is guided with respect to the injection-molding machine by a fixed rail 132 extending longitudinally along the base 100a of this machine and engaged from opposite sides by the rollers 131a and 131b of the guide device represented generally at 121 and forming an outrigger from the carriage. The rail 132 and the guide unit 131 are so positioned as to move the carriage precisely at a right angle to the guides 121 of the mold-carrying plate 100 and the direction of insertion C of the mold or the direction of retraction D thereof.

The electrohydraulic drive, which is here represented by a motor in a motor housing 130d, can be controlled by limit switches such as the limit switch 135 seen in FIG. 1. The electrical cables connecting the limit switch with the electrohydraulic circuit have not been shown.

In FIG. 2.1, it has been made clear that the pair of rails 131a and 131b can form part of a triad of rollers, two of which can engage the outside of the rail 132 while the other engages the inside of the rail. A traid of rollers provides a more precise guide path for the carriage.

The carriage 130 is provided with at least one transverse transport represented generally at 133 and preferably formed with at least one horizontal roller conveyor. Preferably, however, two such transverse transports 133' and 133" are provided in a spaced relationship in the direction of displacement E of the carriage.

From FIG. 1 it can be seen that the lower longitudinal edges of the adapter plates 109 and 110 can rest upon the rollers 133a of the respective roller conveyor 133. In addition, the mechanism also comprises a unit 134 which is forceably engageable with the mold, i.e. can grip the latter to retract the mold or push the mold. This mold-shifting means can comprise a tong-like clamping rail 136 which can grip, by scissor action or the like, a mold 104 to allow the arm 134a displaced by an actuator 134b to shift the mold 104 from the position shown in FIG. 1 into the injection-molding machine. The clamp 136 can also reach into the machine, grip a right-hand side or edge of the mold and withdraw it from the machine onto the roller conveyor 103.

When the carriage 130 is provided with two transverse transports 133' and 133", each of them is provided with a respective mold shifter 134', 134" so that either one can be utilized to withdraw a previous mold onto the carriage while the other shoves a mold transversely on the carriage into the injection-molding machine.

An operator 134b for the shifting arm 134a can be a horizontally oriented hydraulic cylinder.

As has been indicated earlier, one or more limit switches serve to stop the carriage in the precise position to allow insertion or retraction of a mold. To be certain that a mold on the carriage is properly aligned with the guides 121, we have found it to be advantageous to provide the carriage itself with a guide 137 for each of the roller conveyors 133' and 133" so that the guide position of the carriage to be lined up with the guides on the mold-carrying plate 101 is positively defined. To this end, the roller conveyor of the particular transverse transport is subdivided into two roller conveyors 140, 141, the latter having the longer rollers, while the former has comparatively short or stub rollers. The short stub rollers 140 carry the adapter plate 109 to be mounted upon the fixed mold-carrying plate. The guide 137 comprises a pair of bars 138 and 139 which flank the outer and inner faces of the plate 109 adjacent the lower longitudinal edge thereof and are directly aligned with the lower guide 121.

The flanks of the bars 138, 139 are shaped complementarily to the faces of the adapter plate 109 and, in the embodiment shown, the bar 138 has a bevel flank to cooperate with the bevel on the inner or front face of the adapter plate 109. The bars 138 and 139 constitute the jaws previously described.

Figure 4:
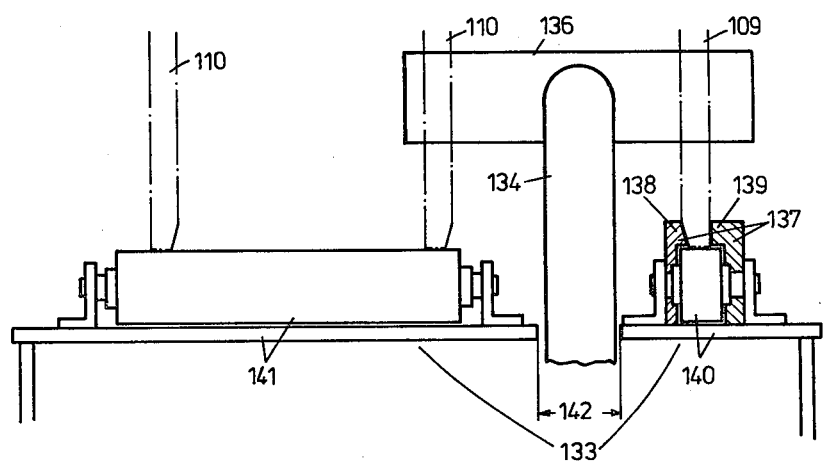
FIG. 4 is another enlarged view showing an elevation in the direction of arrow IV of FIG. 1.

The length of the rollers of the portion 141 of the roller conveyor must be sufficient to allow the adapter plate 110 to ride thereon for all ranges of mold sizes to be accommodated in the injection-molding machine. The corresponding adapter plates for a comparatively short mold and a comparatively long mold are shown in dot-dash lines at 110 in FIG. 4.

Between the two portions 140 and 141 of the roller conveyor, the carriage is provided with an elongated gap 142 through which the arm of the respective shifter 134 can move.

When the shifter 134' or 134" is actuated, the respective arm can displace a mold previously positioned on the respective roller conveyor into the injection-molding machine and to allow the mold to ride accurately into position on the molds 121, the machine is provided with a roller conveyor whose rolls are represented at 143 in the space between the roller conveyor of the carriage and the mold-carrying plate 101.

After the mold is fully inserted in the guides 121, cylinders 125 are actuated to clamp the adapter plate 109 in place.

Subsequently, the mold-carrying plate 102 is shifted toward the mold-carrying plate 101 to position the adapter plate 110 on the mold-carrying plate 102. The clamps of this mold-carrying plate are then actuated.

When the mold has previously been used in the injection-molding machine, it can be removed by the other transverse transport. Because the two transverse transports are substantially identical, either can be used for retraction of a mold or an insertion thereof.

Vertical adjusters 145, such as self-locking screw and nut arrangements, can be provided between the frames 144 forming the superstructure 133b of the carriage and provided with the transverse transports, and the undercarriage 130a. A slope or irregularity or even settling of the foundation can be compensated for by this adjustment means.

The roller conveyor 133 which is fixed on the injection-molding machine also should be adjustable to permit precise insertion of the adapter plate 109 in the guides 121.

Figure 6:
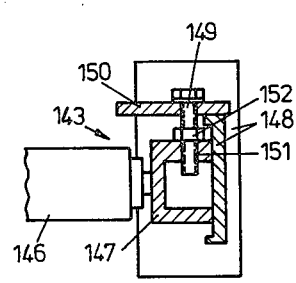
FIG. 6 is a section taken along the line VI—VI of FIG. 5.
Figure 5:
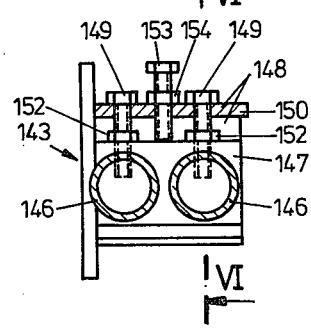
FIG. 5 is a detail view of the region V of FIG. 1.

FIGS. 5 and 6 show an arrangement for such adjustment and here the rollers 146 or roller conveyor 143 are seen to be jointly mounted in blocks 147 on a bracket 148 which has respective screw adjusting spindles 149 from which the blocks are suspended to allow individual positioning of the two rollers. The bracket, in turn, is adjustably suspended from a support to permit adjustment of the height of the conveyor 143 itself. Counternuts 152 permit the setting of the spindle 149 to be fixed while the counternut 154 locks the spindle 153 against undesired movement.

FIG. 2.2 shows an arrangement in which the carriage can be disposed somewhat further from the injection-molding machine 100, the space between the carriage and the machine being bridged by two stationary roller conveyors 155' and 155". These conveyors can be driven in opposite senses and they can be shifted along the rail 132 to bring them alternately into position so that, for example, the unit 154' can serve as the mold-injection transparent wheel. The unit 154" serves the mold-removal transport. The spacing of the two conveyors is such that they align with the transverse transports 133' and 133" of the carriage 130.

Naturally, a displacement of the intermediate conveyors 155' and 155" can be eliminated if these conveyors run over the full length of all molds which can be handled by the machine, i.e. can pick up or deliver molds regardless of their size without such movement.

If the ends of the two transports 155' and 155" are at a considerable distance from the injection-molding machine 100, the transport carriage 130 can be provided with a steerable drive system which can have its steering directions controlled inductively by an induction rail in the floor. This can ensure proper positioning of the carriage. The carriage 130 can thus travel fairly freely over the plant floor but can be guided by the induction steering control to engage the guide wheel 132 when it approaches the injection-molding machine.

Utilizing this system program replacement of molds can be effected quickly and simply with a minimum of down-time.

We claim:

1. A rapid mold-change system for an injection-molding machine installation having a pair of mold-carrying plates at least one of which is movable relative to the other horizontally in an injection-molding machine in a mold opening and mold closing direction, said system comprising:
    a horizontal guide extending perpendicular to said direction in a horizontal mold replacement direction on at least one of said mold-carrying plates;
    a mold engageable in said guide and shiftable in said mold replacement direction into and out of said guide, said mold having a pair of mold halves respectively engageable with said mold-carrying plates;
    locking means on said mold-carrying plates for retaining the respective mold halves thereon;
    a horizontal fixed rail extending in said mold opening and closing direction horizontally laterally alongside said machine, and
    a mold replacement mechanism including:
        a carriage riding on said rail and displaceable in said mold opening and mold closing direction alongside said machine,
        a transverse transport on said carriage alignable with said guide by movement of said carriage along said rail, and
        mold transfer means on said carriage displaceable in said mold replacement direction on said carriage for retracting a mold horizontally from said guide on said transverse transport and for displacing a mold horizontally on said transverse transport into said guide.

2. The rapid mold-change system defined in claim 1, further comprising a limit switch for precise positioning said carriage along said rail.

3. The rapid mold-change system defined in claim 2, further comprising an electrohydraulic drive for said carriage along said rail controlled by said limit switch.

4. The rapid mold-change system defined in claim 1 wherein said carriage is provided with a set of rollers engaging opposite flanks of said rail for guiding said carriage along said rail.

5. The rapid mold-change system defined in claim 1 wherein said carriage comprises two substantially similar transverse transports spaced apart in the direction of displacement of said carriage along said rail and alternately alignable with said guide.

6. The rapid mold-change system defined in claim 5 wherein one of said transverse transports is constructed and arranged to withdraw a mold from said injection-molding machine and the other of said transverse transports is constructed and arranged to insert a mold previously positioned therein into said injection-molding machine.

7. The rapid mold-change system defined in claim 6 wherein each of said transverse transports includes a roller conveyor having a transport plane which is coplanar with a guide plane of said guide.

8. A rapid mold-change system for an injection-molding machine installation having a pair of mold-carrying plates at least one of which is movable relative to the other horizontally in an injection-molding machine in a mold opening and mold closing direction, said system comprising:
    a horizontal guide extending perpendicular to said direction in a horizontal mold replacement direction on at least one of said mold-carrying plates;
    a mold engageable in said guide and shiftable in said mold replacement direction into and out of said guide, said mold having a pair of mold halves respectively engageable with said mold-carrying plates;
    locking means on said mold-carrying plates for retaining the respective mold halves thereon;
    a horizontal fixed rail extending in said mold opening and closing direction horizontally laterally alongside said machine, and
    a mold replacement mechanism including:
        a carriage riding on said rail and displaceable in said mold opening and mold closing direction alongside said machine,
        a transverse transport on said carriage alignable with said guide by movement of said carriage along said rail, and
        mold transfer means on said carriage displaceable in said mold replacement direction on said carriage for retracting a mold horizontally from said guide on said transverse transport and for displacing a mold horizontally on said transverse transport into said guide, said carriage comprising two substantially similar transverse transports spaced apart in the direction of displacement of said carriage along said rail and alternately alignable with said guide, one of said transverse transports being constructed and arranged to withdraw a mold from said injection-molding machine and the other of said transverse transports being constructed and arranged to insert a mold previously positioned therein into said injection-molding machine, each of said transverse transports including a roller conveyor having a transport plane which is coplanar with a guide plane of said guide, each roller conveyor being provided with a mold-engaging arm for displacing said mold in said mold replacement direction.

9. The rapid mold-change system defined in claim 7 wherein each roller conveyor comprises two sets of rollers, the rollers of one set being longer than the rollers of the other set, the rollers of said one set being provided with a pair of guide members receiving a portion of said mold between them and aligned with said guide.

10. The rapid mold-change system defined in claim 9 wherein said members have flanks complementary to the flank of said portion of said mold for formfittingly engaging same.

11. The rapid mold-change system defined in claim 10 wherein the rollers of the other set are sufficiently long to accommodate molds of the entire range of mold lengths adapted to be used in said machine.

12. The rapid mold-change system defined in claim 11, further comprising means providing a gap between said sets through which said arm passes.

13. The rapid mold-change system defined in claim 1, further comprising means for vertically adjusting the position of said transverse transport.

14. The rapid mold-change system defined in claim 1, further comprising an intermediate roller conveyor between said carriage and said guide for supporting said mold while it is disposed between said carriage and said guide.

15. The rapid mold-change system defined in claim 14, further comprising means for vertically adjusting the position of said intermediate conveyor.

16. The rapid mold-change system defined in claim 1 wherein one of said mold-carrying plates is a fixed-mold carrying plate and is provided with said guide, the other of said mold-carrying plates being movable in said mold opening and mold closing direction and is provided with another guide engaging said mold by movement in said mold closing direction, the guides of said mold-carrying plates including bevelled cams hydraulically displaceable against said mold to urge the respective mold halves against said mold-carrying plates.

17. The rapid mold-change system defined in claim 16 wherein each of said mold halves is mounted on a respective adapter plate, said adapter plates being respectively engaged in said guides, the adapter plate for said fixed mold-carrying plate having a valve edge facilitating its insertion into the guide of said fixed mold-carrying plate.

18. The rapid mold-change system defined in claim 17 wherein the adapter plate adapted to be engaged with said movable mold-carrying plate is provided with a centering projection receivable in a recess in said movable mold-carrying plate.

19. The rapid mold-change system defined in claim 15 wherein one of said mold-carrying plates is a fixed-mold carrying plate and is provided with said guide, the other of said mold-carrying plates being movable in said mold opening and mold closing direction and is provided with another guide engaging said mold by movement in said mold closing direction, the guides of said mold-carrying plates including bevelled cams hydraulically displaceable against said mold to urge the respective mold halves against said mold-carrying plates.

20. The rapid mold-change system defined in claim 6 wherein one of said mold-carrying plates is a fixed-mold carrying plate and is provided with said guide, the other of said mold-carrying plates being movable in said mold opening and mold closing direction and is provided with another guide engaging said mold by movement in said mold closing direction, the guides of said mold-carrying plates including bevelled cams hydraulically displaceable against said mold to urge the respective mold halves against said mold-carrying plates.

* * * * *